(12) United States Patent
Xia et al.

(10) Patent No.: US 11,515,991 B2
(45) Date of Patent: Nov. 29, 2022

(54) USER EQUIPMENT, BASE STATION AND WIRELESS COMMUNICATION METHOD

(71) Applicant: Panasonic Intellectual Property Corporation of America, Torrance, CA (US)

(72) Inventors: Xiaohan Xia, Beijing (CN); Lilei Wang, Beijing (CN); Hidetoshi Suzuki, Kanagawa (JP); Prateek Basu Mallick, Hessen (DE); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 529 days.

(21) Appl. No.: 16/326,505

(22) PCT Filed: Sep. 29, 2016

(86) PCT No.: PCT/CN2016/100877
§ 371 (c)(1),
(2) Date: Feb. 19, 2019

(87) PCT Pub. No.: WO2018/058455
PCT Pub. Date: Apr. 5, 2018

(65) Prior Publication Data
US 2021/0281386 A1 Sep. 9, 2021

(51) Int. Cl.
*H04L 5/14* (2006.01)
*H04B 17/336* (2015.01)
(Continued)

(52) U.S. Cl.
CPC ............ *H04L 5/14* (2013.01); *H04B 17/336* (2015.01); *H04W 24/10* (2013.01); *H04W 52/365* (2013.01); *H04W 72/0413* (2013.01)

(58) Field of Classification Search
CPC combination set(s) only.
See application file for complete search history.

(56) References Cited

U.S. PATENT DOCUMENTS

| | | | |
|---|---|---|---|
| 2009/0179755 A1* | 7/2009 | Bachl | H04W 72/082 340/540 |
| 2009/0213765 A1 | 8/2009 | Rinne et al. | |

(Continued)

FOREIGN PATENT DOCUMENTS

| | | |
|---|---|---|
| JP | 2014-505416 A | 2/2014 |
| JP | 2015-095668 A | 5/2015 |

(Continued)

OTHER PUBLICATIONS

International Search Report of PCT application No. PCT/CN2016/100877 dated Jun. 22, 2017.

*Primary Examiner* — Yee F Lam
(74) *Attorney, Agent, or Firm* — Seed IP Law Group LLP

(57) ABSTRACT

Provided are a user equipment, base station and wireless communication method related to interference report in full duplex operation. A user equipment comprises: circuitry operative to form interference information about interference from at least one of the user equipment itself and at least one neighboring user equipment of the user equipment; and a transmitter operative to transmit the interference information to a base station, wherein full duplex operation is performed between the user equipment and at least the base station.

12 Claims, 6 Drawing Sheets

(51) Int. Cl.
*H04W 24/10* (2009.01)
*H04W 52/36* (2009.01)
*H04W 72/04* (2009.01)

(56) References Cited

U.S. PATENT DOCUMENTS

| | | | |
|---|---|---|---|
| 2010/0067469 A1* | 3/2010 | Gaal | H04W 72/082 370/329 |
| 2012/0176923 A1 | 7/2012 | Hsu et al. | |
| 2013/0229952 A1 | 9/2013 | Koskinen et al. | |
| 2015/0043365 A1* | 2/2015 | Park | H04W 52/0238 370/252 |
| 2015/0049705 A1* | 2/2015 | Feuersaenger | H04W 72/1215 370/329 |
| 2015/0180634 A1 | 6/2015 | Hoshino et al. | |
| 2015/0229461 A1* | 8/2015 | DiFazio | H04L 5/14 370/280 |
| 2015/0280887 A1* | 10/2015 | Ko | H04B 7/2621 370/330 |
| 2015/0382375 A1* | 12/2015 | Bhushan | H04W 72/1289 370/252 |
| 2016/0006521 A1 | 1/2016 | Yoshimoto et al. | |
| 2016/0044566 A1* | 2/2016 | Nammi | H04B 1/1027 370/331 |
| 2016/0127114 A1 | 5/2016 | Kim et al. | |
| 2016/0156453 A1 | 6/2016 | Chien et al. | |
| 2016/0345315 A1 | 11/2016 | Noh et al. | |
| 2017/0026990 A1* | 1/2017 | Lu | H04W 72/1247 |
| 2017/0033916 A1* | 2/2017 | Stirling-Gallacher | H04L 5/14 |
| 2017/0054544 A1* | 2/2017 | Kazmi | H04B 17/309 |
| 2017/0302337 A1* | 10/2017 | Liu | H04B 7/005 |
| 2017/0310417 A1* | 10/2017 | Jung | H04J 15/00 |
| 2018/0049230 A1* | 2/2018 | Moradi | H04W 72/1231 |
| 2018/0062824 A1* | 3/2018 | Noh | H04L 5/16 |
| 2019/0052450 A1* | 2/2019 | Fodor | H04L 5/1461 |

FOREIGN PATENT DOCUMENTS

| | | | |
|---|---|---|---|
| JP | 2017-506841 A | 3/2017 | |
| WO | 2014/020828 A1 | 2/2014 | |
| WO | 2014/046761 A1 | 3/2014 | |
| WO | 2014/136620 A1 | 9/2014 | |
| WO | 2015/096027 A1 | 7/2015 | |
| WO | 2015/122732 A1 | 8/2015 | |
| WO | WO-2016072687 A1 * | 5/2016 | H04J 11/004 |
| WO | WO-2016106604 A1 * | 7/2016 | H04L 5/16 |
| WO | WO-2017144104 A1 * | 8/2017 | H04W 72/082 |

* cited by examiner

USER EQUIPMENT, BASE STATION AND WIRELESS COMMUNICATION METHOD

BACKGROUND

1. Technical Field

The present disclosure relates to the field of wireless communication, and in particular, to a user equipment (UE), a base station and a wireless communication method related to interference report in full duplex operation.

2. Description of the Related Art

Full duplex is a further study in 3GPP (The 3rd Generation Partnership Project) and means DL (Downlink) and UL (Uplink) channels can be transmitted in the same time/frequency resources. Full duplex is supposed to be a desired feature in NR (New Radio access technology)/5G as it can largely improve the spectral efficiency (ideally 2 times). Specifically, in order to facilitate understanding the concept of full duplex in NR, FIG. 1 schematically illustrates three cases for comparison: (A) FDD (Frequency Division Duplexing) LTE (Long Term Evolution); (B) TDD (Time Division Duplexing) LTE; and (C) full duplex in NR. As shown in FIG. 1(A)-(C), the horizontal axis indicated by T represents time domain while the vertical axis indicated by F represents frequency domain. It can be seen from FIG. 1(A)-(B) that, in FDD LTE, DL and UL channels uses different frequency resources at a same time resource, while in TDD LTE, DL and UL channels uses different time resources at a same frequency carrier. In contrast, as shown in FIG. 1(C), in full duplex, DL and UL channels are in same PRBs (Physical Resource Blocks), that is, use same physical (i.e. time/frequency) resources. Thus, when compared with traditional FDD and TDD, full duplex can largely improve the spectral efficiency, for example 100% improvement ideally.

SUMMARY

One non-limiting and exemplary embodiment provides an approach to reduce the interference on reference signals in full-duplex.

In a first general aspect of the present disclosure, there is provided a user equipment, comprising: circuitry operative to form interference information about interference from at least one of the user equipment itself and at least one neighboring user equipment of the user equipment; and a transmitter operative to transmit the interference information to a base station, wherein full duplex operation is performed between the user equipment and at least the base station.

In a second general aspect of the present disclosure, there is provided a base station, comprising: a receiver operative to receive interference information from a user equipment, wherein the interference information is about interference from at least one of the user equipment itself and at least one neighboring user equipment of the user equipment; and circuitry operative to perform scheduling based on the interference information, wherein full duplex operation is performed between the user equipment and at least the base station.

In a third general aspect of the present disclosure, there is provided a wireless communication method for a user equipment, comprising: forming interference information about interference from at least one of the user equipment itself and at least one neighboring user equipment of the user equipment; and transmitting the interference information to a base station, wherein full duplex operation is performed between the user equipment and at least the base station.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
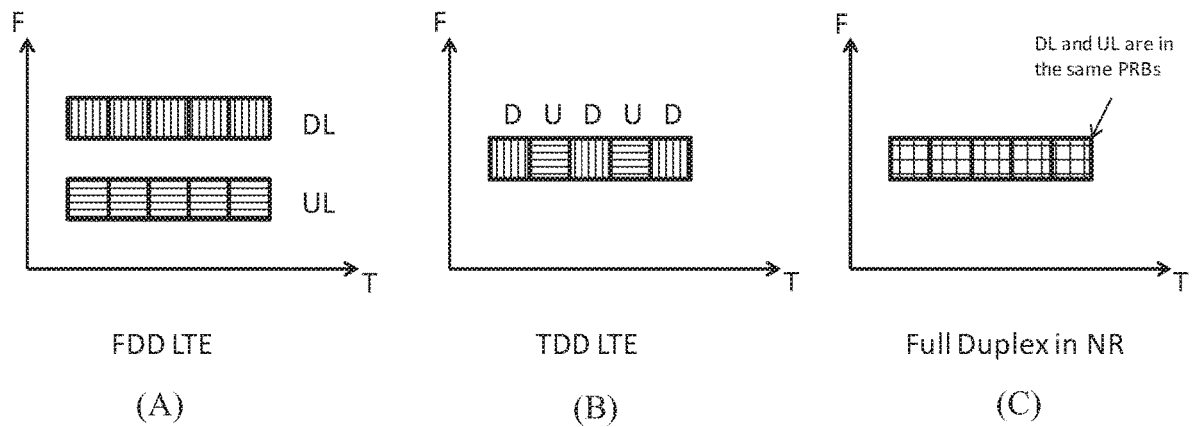
FIG. 1 schematically illustrates three cases for comparison: (A) FDD (Frequency Division Duplexing) LTE (Long Term Evolution); (B) TDD (Time Division Duplexing) LTE; and (C) full duplex in NR.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

As shown in FIG. 1(C), since DL and UL channels use same physical (i.e. time/frequency) resources in full duplex operation (communication), DL and UL channels will interfere with each other. Thus, at UE side, DL signal reception will be influenced by UL signal transmission from the UE itself or a neighboring UE thereof. Here, the interference from the UE itself may be referred to be as intra-UE-interference and the interference from a neighboring UE thereof may be referred to be as inter-UE-interference, and both will be discussed in detail with reference to figures below.

Figure 2:
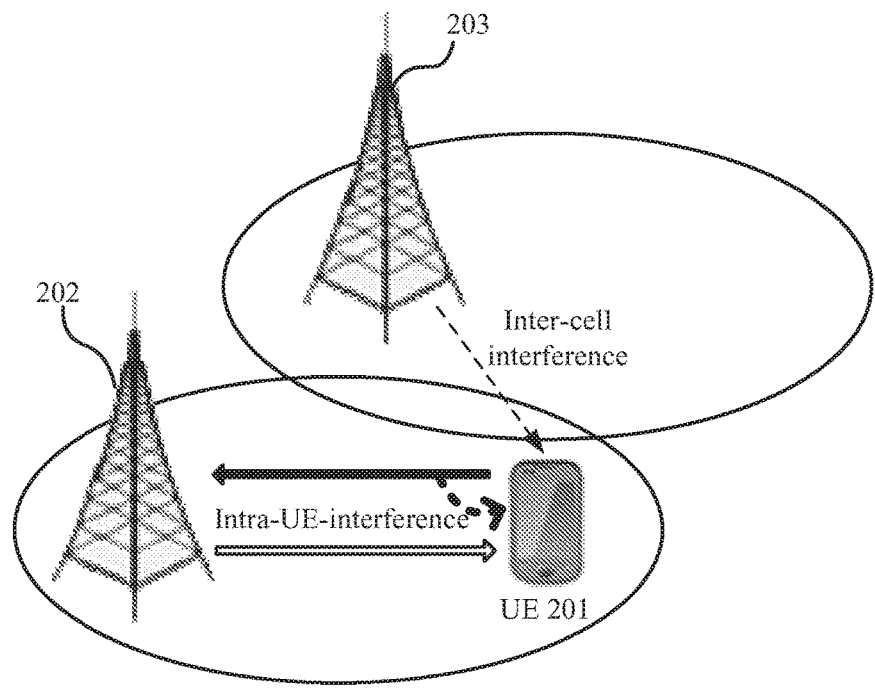
FIG. 2 schematically illustrates an example full duplex scenario in which intra-UE-interference is present.

FIG. 2 schematically illustrates an example full duplex scenario in which intra-UE-interference is present. As shown in FIG. 2, it is assumed that full duplex operation is performed between UE 201 and a base station 202. Specifically, the solid arrow pointing left indicates that UE 201 transmits UL signals to the base station 202 in a full-duplex physical resource scheduling unit and the hollow arrow pointing right indicates that the base station 202 transmits DL signals to UE 201 in the same full-duplex physical resource scheduling unit. That is to say, in such a full-duplex physical resource scheduling unit, UL and DL transmission is for a same UE, i.e. UE 201. In this case, UL signal transmission from UE 201 itself will influence the DL signal reception at UE 201 side. That is, the interference from UE 201 itself, i.e. intra-UE-interference is present at UE 201 side as shown by the thick dashed arrow in FIG. 2.

Noted that, the term "a full-duplex physical resource scheduling unit" means a physical resource unit with which full duplex operation is scheduled. More specifically, in one full-duplex physical resource scheduling unit, the UL physical resources therein are scheduled for only one UE for UL transmission meanwhile the DL physical resources therein are also scheduled for only one UE for DL reception. Multiple UEs are scheduled in the same UL or DL physical resources are also possible depending on MIMO or MU-MIMO operation. But at least there would be one DL channel and one UL channel transmitted simultaneously in the same resource unit. In one full-duplex physical resource scheduling unit, UL physical resources and DL physical resources may be assigned to a same UE (as shown in FIG. 2) or two different UEs (will be discussed later). The full-duplex physical resource scheduling unit may be a PRB in frequency domain or a TTI (Transmission Time Interval) in time domain for example; however, the present disclosure is not limited thereto.

As shown in FIG. 2, at UE 201 side, in addition to the intra-UE-interference indicated by the thick dashed arrow, the received signals may include other types of interference such as noise, inter-cell interference from the base station 203 in a neighboring cell as shown by the thin dashed arrow. The base station 202 cannot distinguish well interference types (e.g., inter-cell interference or intra-UE-interference) and interference levels based on current CQI (Chanel Quality Indicator) mechanism or RSRQ (Reference Signal Received Quality) or RSSI (Received Signal Strength Indication) report, since all of them reflect only total interference information. In addition, the intra-UE-interference can't be directly measured by the base station 202, since the intra-UE-interference is relative to UE 201's circuit environment and RF (Radio Frequency) components, which are unknown to the base station 202. Furthermore, utilizing current CSI (Channel State Information) report mechanism can't easily and accurately get intra-UE-interference information.

Thus, the base station 202 may make a wrong decision on full duplex operation scheduling since it does not know the interference is coming from another cell (e.g. the base station 203) or from UE 201 itself. For example, when the intra-UE-interference is dominant, since the base station 202 does not get the knowledge, it may try to reduce inter-cell interference for example by coordination. However, its effort is in vain and full duplex operation should be stopped instead. Thus, it is important for the base station 202 to get the knowledge about the intra-UE-interference from UE 201 in full duplex operation.

Figure 3:
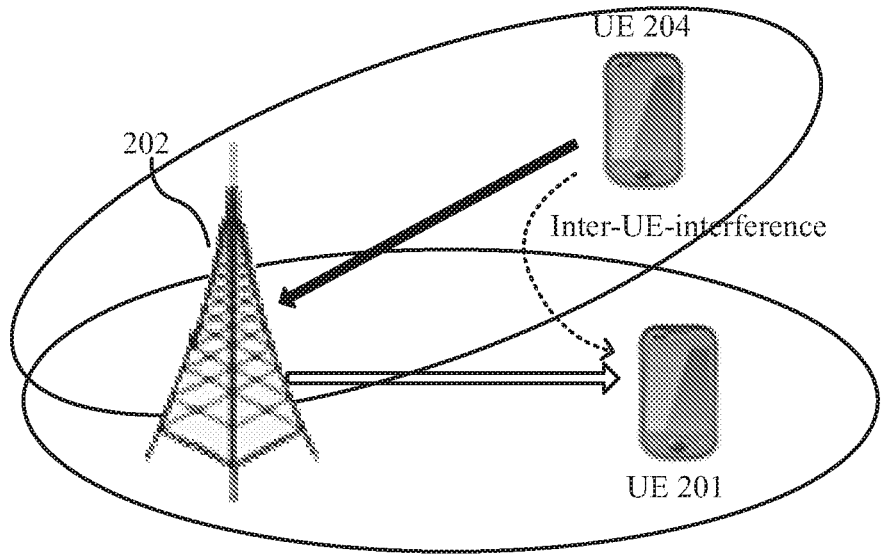
FIG. 3 schematically illustrates another example full duplex scenario in which inter-UE-interference is present.

FIG. 3 schematically illustrates another example full duplex scenario in which inter-UE-interference is present. In FIG. 3, same elements as those in FIG. 2 are denoted with same reference numbers as those in FIG. 2, for example, the base station 202 and UE 201. The difference from FIG. 2 is that there is further a UE 204 as a neighboring UE of UE 201 in a same cell in FIG. 3. Specifically, the solid arrow indicates that UE 204 transmits UL signals to the base station 202 in a full-duplex physical resource scheduling unit and the hollow arrow indicates that the base station 202 transmits DL signals to UE 201 in the same full-duplex physical resource scheduling unit. That is to say, in such a full-duplex physical resource scheduling unit, UL and DL transmission is for two different UEs, i.e. UE 204 and UE 201. In this case, UL signal transmission from UE 204 will influence the DL signal reception at UE 201 side. That is, the interference from UE 204, i.e. inter-UE-interference is present at UE 201 side as shown by the dashed arrow in FIG. 3.

As described above for a full-duplex physical resource scheduling unit, the scenario shown in FIG. 2 may be considered as corresponding to one full-duplex physical resource scheduling unit (for example, one PRB or TTI) in which the UL and DL physical resources therein are scheduled for only UE 201, and the scenario shown in FIG. 3 may be considered as corresponding to another full-duplex physical resource scheduling unit (for example, another PRB or TTI) in which the UL physical resources therein are scheduled for UE 204 for UL signal transmission while the DL physical resources therein are scheduled for UE 201 for DL signal reception.

Although not shown in FIG. 3, similarly, at UE 201 side, in addition to the inter-UE-interference indicated by the dashed arrow, the received signals may include other types of interference such as noise, inter-cell interference. Thus, in this case, the base station 202 cannot distinguish well interference types (e.g., inter-cell interference or inter-UE-interference) and interference levels based on current CQI mechanism or RSRQ or RSSI report and cannot measure the inter-UE-interference directly. Furthermore, utilizing current CSI report mechanism can't easily and accurately get inter-UE-interference information either.

Thus, similarly as in FIG. 2, in the scenario shown in FIG. 3, the base station 202 may also make a wrong decision on full duplex operation scheduling since it does not know the interference is coming from another cell (e.g. the base station 203) or from UE 204. Thus, it is also important for the base station 202 to get the knowledge about the inter-UE-interference from UE 204 in full duplex operation.

Figure 4:
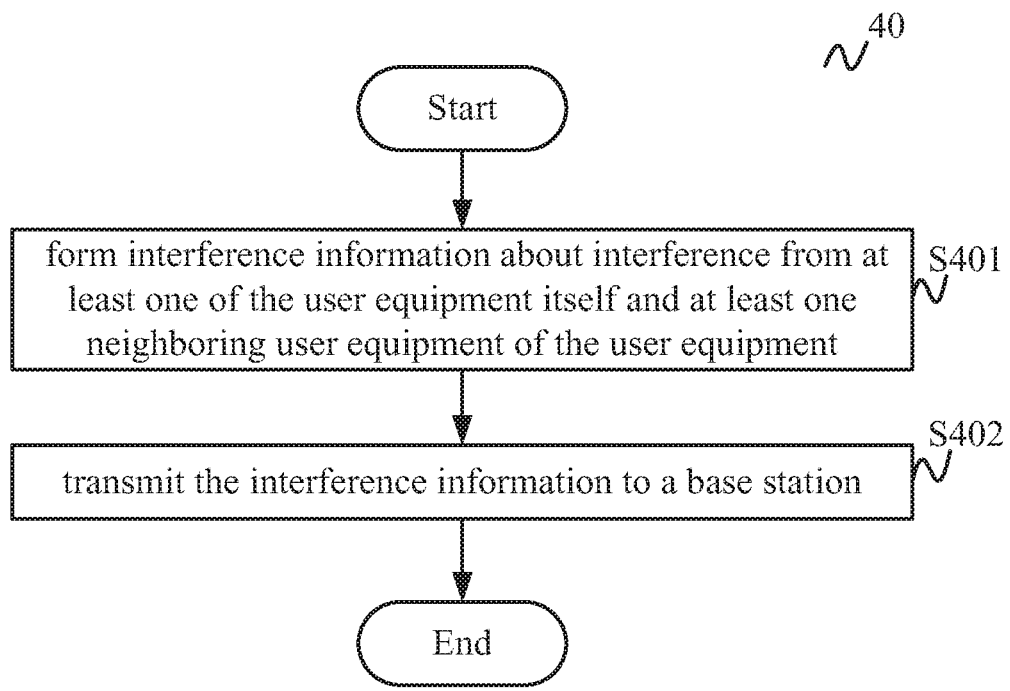
FIG. 4 illustrates a flowchart of a wireless communication method for a user equipment according to an embodiment of the present disclosure.

In an embodiment of the present disclosure, there is provided a wireless communication method 40 for a user equipment as shown in FIG. 4. FIG. 4 illustrates a flowchart of a wireless communication method 40 for a user equipment according to an embodiment of the present disclosure.

As shown in FIG. 4, the wireless communication method 40 starts at step S401 in which interference information about interference from at least one of the user equipment itself and at least one neighboring user equipment of the user equipment is formed. Then, at step S402, the interference information is transmitted to a base station. After step S402, the wireless communication method 40 ends.

In the wireless communication method 40, full duplex operation is performed between the user equipment and at least the base station. That is to say, the wireless communication method 40 is applied to full duplex scenarios.

For example, the user equipment may be UE 201 in FIGS. 2 and 3. More specifically, for the scenario as shown in FIG. 2, with the wireless communication method 40 as shown in FIG. 4, UE 201 may form and transmit the interference information about interference from UE 201 itself, that is, the interference information about intra-UE-interference, to the base station 202. Thus, the base station 202 can perform scheduling based on the interference information about intra-UE-interference, thereby improving the accuracy of scheduling and the system performance.

In addition, for the scenario as shown in FIG. 3, with the wireless communication method 40 as shown in FIG. 4, UE 201 may form and transmit the interference information about interference from UE 204 as a neighboring UE thereof, that is, the interference information about inter-UE-interference, to the base station 202. Thus, the base station 202 can perform scheduling based on the interference information about inter-UE-interference, thereby improving the accuracy of scheduling and the system performance.

It is noted that the interval of reporting the interference information from the user equipment to the base station may be larger than one full-duplex physical resource scheduling unit (e.g. one PRB or TTI). In different PRBs or TTIs, full duplex operations may be different. Fox example, it is assumed that one report interval corresponds to multiple PRBs or TTIs, some of the multiple PRBs or TTIs correspond to the scenario shown in FIG. 2, and other PRBs or TTIs correspond to the scenario shown in FIG. 3. In this case, both intra-UE-interference present in the some PRBs or TTIs and inter-UE-interference present in the other PRBs or TTIS need to be reported to the base station.

In addition, when there is only intra-UE-interference present in the report interval, only interference information about the intra-UE-interference is reported to the base station at this report time. Otherwise, when there is only inter-UE-interference present in the report interval, only interference information about the inter-UE-interference is reported to the base station at this report time.

Although there is only one neighboring UE 204 in the scenario shown in FIG. 3, there may be multiple neighboring UEs of UE 201 in other scenarios not shown here. In this case, if there is different inter-UE-interference from different neighboring UEs present in different PRBs or TTIs in one report interval, all of inter-UE-interference from different neighboring UEs needs to be reported to the base station at this report time. Similarly, if in this report interval, there is further intra-UE-interference in this interval, the intra-UE-interference from the UE itself and all of inter-UE-interference from different neighboring UEs needs to be reported to the base station at this report time.

In addition, as described above, the full duplex operation may be performed between only UE 201 and the base station 202 in a full-duplex physical resource scheduling unit, that is, UL and DL transmission is for a same UE. When there are one or more neighboring UEs of UE 201, the full duplex operation may also be performed among the base station 202, the UE 201 and one of neighboring UEs, that is, UL and DL transmission is for two different UEs, in a full-duplex physical resource scheduling unit.

Furthermore, the full duplex operation may also be performed among UEs through sidelinks. For example, although not shown in FIG. 3, the full duplex operation may also be performed between UE 201 and UE 204 through sidelinks between them. For another example, in a same physical unit, UE 201 may receive signal from UE 204 via a sidelink between them and UE 204 may receive signal from another UE (not shown in FIG. 3) via a sidelink between them. In addition, there may be a more complicated case that DL/UL channels and sidelink channels are mixed. For example, UE 201 receives DL signal from the base station 202 while transmitting sidelink signal to UE 204. DL and sidelink transmissions are operated in the same time/frequency resources.

With the wireless communication method 40, by reporting the interference information about interference from at least one of the user equipment itself and at least one neighboring user equipment of the user equipment to the base station, the base station can perform scheduling based on the interference information, thereby improving the accuracy of scheduling and the system performance.

In the following, the contents and the transmission manners of the interference information will be discussed in detail by way of examples.

According to an embodiment of the present disclosure, in the wireless communication method 40 as shown in FIG. 4, the interference information comprises the interference cancellation capability of the user equipment, and the interference cancellation capability is transmitted by RRC (Radio Source Control) signaling during the user equipment's capability transfer procedure.

Specifically, for convenience of understanding, the scenario of intra-UE-interference as shown in FIG. 2 for example is taken as an example. For example, the interference cancellation capability may include information on whether full duplex is supported or not by the user equipment and an intra-UE-interference (i.e. self-interference) cancellation level. The intra-UE-interference cancellation level may correspond to RF or baseband or may be a total level for RF and baseband for example, and the present disclosure is not limited thereto. The user equipment's capability transfer procedure is occurred at an initial phase, for example, when the user equipment is powered on.

In this embodiment, it is assumed that UE 201 can support full duplex and interact with the base station 202, as shown in FIG. 2. Thus, based on the interference information reported by UE 201, the base station 202 can judge how or whether to schedule full duplex operation for UE 201.

By reporting only the interference cancellation capability of the user equipment by RRC signaling during the user equipment's capability transfer procedure to the base station, the signaling overhead can be very small (such as 1 bit) while the base station can schedule full duplex operation well based on the reported interference cancellation capability.

According to an embodiment of the present disclosure, in the wireless communication method 40 as shown in FIG. 4, the interference information further comprises an absolute interference from at least one of the user equipment itself and at least one neighboring user equipment of the user equipment.

Specifically, in addition to the interference cancellation capability as mentioned above, the interference information may further include an absolute interference which may be an absolute intra-UE-interference or inter-UE-interference value for example. Then, based on the interference cancellation capability and the absolute interference, the base station can deduce how much interference is remained after the interference is cancelled at the user equipment side and perform scheduling for full duplex operation accordingly.

According to an embodiment of the present disclosure, in the wireless communication method 40 as shown in FIG. 4, the absolute interference is transmitted by RRC signaling periodically or aperiodically. That is to say, in addition to the interference cancellation capability, the absolute interference may also be transmitted by RRC signaling. The difference between them is that the interference cancellation capability is transmitted during the user equipment's capability transfer procedure (for example, an initial phase) while the absolute interference is transmitted subsequently by dedicated RRC signaling periodically or aperiodically.

For convenience of understanding, a scenario of intra-UE-interference is taken as an example. It is assumed that there are two UEs, i.e. UE A and UE B, both of which can support full duplex and interact with a same base station C respectively. Further, a threshold S=5 dB is configured by the base station C in advance to control the full duplex operation (i.e. perform scheduling).

When there is only intra-UE-interference present at UE A side, UE A firstly reports the intra-UE-interference cancellation capability to the base station C by RRC signaling during the its capability transfer procedure. The intra-UE-interference cancellation capability for example includes the information indicating that UE A can support full duplex and an intra-UE-interference level of 110 dB. Subsequently, UE A further reports the absolute intra-UE-interference of 113 dB by dedicated RRC signaling periodically or aperiodically to the base station C. At the base station C side, based on the intra-UE-interference cancellation capability and the absolute intra-UE-interference reported by UE A, the base station C can deduce that the remained intra-UE-interference after the interference is cancelled at UE A side equals to 3 dB by subtracting the intra-UE-interference level of 110 dB from the absolute intra-UE-interference of 113 dB. The remained intra-UE-interference of 3 dB means that SINR (Signal to Interference plus Noise Ratio) will be degraded by about 3 dB if full duplex operation is performed between UE A and the base station C. Next, the base station C compares the remained intra-UE-interference of 3 dB with the threshold S of 5 dB. Since the remained intra-UE-interference is less than the threshold S, the base station S decides that full duplex operation can be performed for UE A.

Similarly, when there is only intra-UE-interference present at UE B side, UE B firstly reports the intra-UE-interference cancellation capability to the base station C by RRC signaling during the its capability transfer procedure. The intra-UE-interference cancellation capability for example includes the information indicating that UE B can support full duplex and an intra-UE-interference level of 102 dB. Subsequently, UE B further reports the absolute intra-UE-interference of 110 dB by dedicated RRC signaling periodically or aperiodically to the base station C. At the base station C side, based on the intra-UE-interference cancellation capability and the absolute intra-UE-interference reported by UE B, the base station C can deduce that the remained intra-UE-interference after the interference is cancelled at UE B side equals to 8 dB by subtracting the intra-UE-interference level of 102 dB from the absolute intra-UE-interference of 110 dB. The remained intra-UE-interference of 8 dB means that SINR will be degraded by about 8 dB if full duplex operation is performed between UE B and the base station C. Next, the base station C compares the remained intra-UE-interference of 8 dB with the threshold S of 5 dB. Since the remained intra-UE-interference is greater than the threshold S, the base station S decides that full duplex operation cannot be performed for UE B.

By reporting the interference cancellation capability and the absolute interference to the base station by RRC signaling respectively, the signaling overhead can be small and the impact on physical layer standard is little, meanwhile the base station can schedule full duplex operation well based on the combination of the interference cancellation capability and the absolute interference.

According to an embodiment of the present disclosure, in the wireless communication method 40 as shown in FIG. 4, the absolute interference is transmitted in MAC (Media Access Control) layer and accompanied by PHR (Power Headroom Report) based on PHR report timing.

Although the previous embodiment shows that the absolute interference can be transmitted by RRC signaling periodically or aperiodically to the base station, the present disclosure is not limited thereto.

Also, UEs A and B are taken as an example. Considering that intra-UE-interference may vary with the change of the transmission power, the absolute intra-UE-interference can also be transmitted in MAC layer, for example, in MAC CE (Control Element) to the base station C and be accompanied by PHR. That is to say, the reporting of the absolute intra-UE-interference and that of PHR is at the same time and may be based on PHR report timing.

Thus, at the base station C side, based on the absolute intra-UE-interference and PHR reported by UE A/B, the base station C may judge the relationship between the intra-UE-interference and the transmission power for UE A/B, and adjust the transmission power accordingly to reduce the intra-UE-interference and improve the performance of full duplex operation.

According to an embodiment of the present disclosure, in the wireless communication method 40 as shown in FIG. 4, the interference information comprises a residual interference from at least one of the user equipment itself and at least one neighboring user equipment of the user equipment.

Although the above embodiments show that the interference cancellation capability and the absolute interference may be reported to the base station and the base station in turn deduce the remained interference after the interference is cancelled at the user equipment side based on the both information, the present disclosure is not limited thereto. Instead, only a residual interference may be reported to the base station for scheduling. The residual interference is equivalent to the remained interference after the interference is cancelled at the user equipment side.

More specifically, UEs A and B are still taken as an example for convenience of understanding. For example, UE A can directly transmit the residual intra-UE-interference of 3 dB (which is equivalent to the remained intra-UE-interference of 3 dB) to the base station C. In this case, based on the residual intra-UE-interference of 3 dB, the based station C needs not to perform deduction again and only need to compare the residual intra-UE-interference of 3 dB with the threshold S of 5 dB and decides that full duplex operation can be performed for UE A.

Similarly, UE B can also directly transmit the residual intra-UE-interference of 8 dB (which is equivalent to the remained intra-UE-interference of 8 dB) to the base station C. In this case, based on the residual intra-UE-interference of 8 dB, the based station C needs not to perform deduction again and only need to compare the residual intra-UE-interference of 8 dB with the threshold S of 5 dB and decides that full duplex operation cannot be performed for UE B.

With reporting the residual interference to the base station, the signaling overhead can be reduced and the processing load at the base station side may be reduced too.

According to an embodiment of the present disclosure, in the wireless communication method 40 as shown in FIG. 4, the residual interference is transmitted in physical layer either periodically, or aperiodically based on a trigger transmitted by downlink control signaling from the base station.

Although the above embodiments show that the interference information may be transmitted by RRC signaling, the present disclosure is not limited thereto. Considering that the report period of RRC signaling is relatively long, the interference information may also be reported in physical layer. Through physical layer, the interference information can be reported more frequently, that is, the physical layer report can reflect instant interference information, and thus can be especially useful for cases that interference variation is fast.

In addition, the residual interference may be transmitted in physical layer periodically, which will be discussed in detail hereinafter. Alternatively, the residual interference may also be transmitted in physical layer aperiodically, for example based on a trigger from the base station. More specifically, for example, only when the system performance degrades to a certain extent, the base station transmits a trigger for example by downlink control signaling (e.g. in DCI (Downlink Control Information) in (E)PDCCH ((Enhanced) Physical Downlink Control Channel)) to the user equipment. Accordingly, only upon reception of the trigger, the user equipment reports the residual interference to the base station.

With aperiodical interference information reporting based on a trigger, signaling overhead can be reduced and the flexibility of reporting the interference information can be improved.

According to an embodiment of the present disclosure, in the wireless communication method 40 as shown in FIG. 4, a new UCI (Uplink Control Information) type is defined for full duplex operation and is transmitted by PUCCH (Physical Uplink Control Channel) or PUSCH (Physical Uplink Shared Channel), wherein the new UCI type indicates one of: a residual interference value; a request for stopping full duplex operation; a residual interference value and a request for stopping full duplex operation; and a request for stopping full duplex operation and an existing UCI type like CQI or HARQ-ACK (Hybrid Automatic Repeat Request-Acknowledge).

Specifically, when the residual interference is reported in physical layer periodically, a new UCI type may be defined and transmitted by PUCCH/PUSCH. A new value representing a request for stopping full duplex can also be included in this UCI for full duplex operation. As an example, Table.1 shows an exemplary UCI design for interference information reporting below.

TABLE 1 an exemplary UCI design for interference information reporting

| Status of 2 bits | 00 | 01 | 10 | 11 |
|---|---|---|---|---|
| Interpretation | 0-2 dB | 2-4 dB | Larger than 4 dB | stopping full duplex |

As shown in Table.1, it is assumed that 2 bits are used for such UCI type. Specifically, when the two bits of UCI are 00, it indicates that the residual interference value after the interference is cancelled at the user equipment side is in the range of 0-2 dB. When the two bits of UCI are 01, it indicates that the residual interference value after the interference is cancelled at the user equipment side is in the range of 2-4 dB. When the two bits of UCI are 10, it indicates that the residual interference value after the interference is cancelled at the user equipment side is larger than 4 dB. When the two bits of UCI are 11, it represents a request for stopping full duplex.

If a user equipment reports the request for stopping full duplex for example utilizing the above UCI type as shown in Table.1 when its residual interference is over the threshold, the based station will stop full duplex operation on such user equipment based on the UCI received from the user equipment.

In addition, residual interference could be a variation with a small dynamic range. Therefore, 3 bits can define eight levels for the residual self-interference value. As another example, Table.2 shows an exemplary UCI design for interference information reporting below.

TABLE 2 an exemplary UCI design for interference information reporting

| Status of 3 bits | 000 | 001 | 010 | 011 | 100 | 101 | 110 | 111 |
|---|---|---|---|---|---|---|---|---|
| Interpretation | 0 dB | 0-1 dB | 1-2 dB | 2-3 dB | 3-4 dB | 4-5 dB | 5-6 dB | Larger than 6 dB |

As shown in Table.2, it is assumed that 3 bits are used for such UCI type. Specifically, when the three bits of UCI are 000, it indicates that the residual interference value after the interference is cancelled at the user equipment side is 0 dB. When the three bits of UCI are 001, it indicates that the residual interference value after the interference is cancelled at the user equipment side is in the range of 0-1 dB. When the three bits of UCI are 010, it indicates that the residual interference value after the interference is cancelled at the user equipment side is in the range of 1-2 dB. When the three bits of UCI are 011, it indicates that the residual interference value after the interference is cancelled at the user equipment side is in the range of 2-3 dB. When the three bits of UCI are 100, it indicates that the residual interference value after the interference is cancelled at the user equipment side is in the range of 3-4 dB. When the three bits of UCI are 101, it indicates that the residual interference value after the interference is cancelled at the user equipment side is in the range of 4-5 dB. When the three bits of UCI are 110, it indicates that the residual interference value after the interference is cancelled at the user equipment side is in the range of 5-6 dB. When the three bits of UCI are 111, it indicates that the residual interference value after the interference is cancelled at the user equipment side is larger than 6 dB.

Table.1 corresponds to the UCI type which indicates both a residual interference value and a request for stopping full duplex operation while Table.2 corresponds to the UCI type which indicates only a residual interference value.

Additionally, a totally new UCI type may be especially designed for stopping full duplex. In this case, a new UCI type can only indicate a request for stopping full duplex operation. Alternatively, such request may also be jointly coded with other existing UCI type. That is to say, a new UCI type may be designed for indicating both a request for stopping full duplex operation and an existing UCI type.

It is noted that the above example designs for UCI are only for purpose of illustrative and the present disclosure is not limited thereto. Those skilled in the art may design any suitable type of UCI based on the teaching from the present disclosure.

According to an embodiment of the present disclosure, in the wireless communication method 40 as shown in FIG. 4, the residual interference is transmitted in MAC layer and accompanied by PHR based on PHR report timing.

Similarly with the absolute interference, the residual interference may also be transmitted in MAC layer and accompanied by PHR based on PHR report timing. Also, UEs A and B are taken as an example. Considering that intra-UE-interference may vary with the change of the transmission power, the residual intra-UE-interference can also be transmitted in MAC layer, for example, in MAC CE to the base station C and be accompanied by PHR. That is to say, the reporting of the residual intra-UE-interference and that of PHR is at the same time and based on PHR report timing.

Thus, at the base station C side, based on the residual intra-UE-interference and PHR reported by UE A/B, the base station C may judge the relationship between the intra-UE-interference and the transmission power for UE A/B, and adjust the transmission power accordingly to reduce the intra-UE-interference and improve the performance of full duplex operation.

Although the above embodiments discuss the reporting of the interference information by taking cases of intra-UE-interference as examples, the present disclosure is not limited thereto. The above example manners of reporting intra-UE-interference can also apply to cases of inter-UE-interference. For example, when there is only inter-UE-interference present at a user equipment side, the user equipment can report only the inter-UE-interference cancellation capability thereof by RRC signaling during its capability transfer procedure to the base station. Alternatively, the user equipment can report the inter-UE-interference cancellation capability thereof by RRC signaling during its capability transfer procedure to the base station and subsequently report an absolute inter-UE-interference to the base station periodically or aperiodically. Alternatively, the user equipment can report only a residual inter-UE-interference to the base station periodically or aperiodically. Similarly, the absolute/residual inter-UE-interference may be transmitted by RRC signaling, in physical layer or in MAC layer.

Also, the above example manners of reporting intra-UE-interference can also apply to cases of reporting both intra-UE-interference and inter-UE-interference, details thereof is no longer described here for avoid redundancy.

It is noted that, the contents and transmission manners of the interference information about the interference from at least one of the user equipment itself and at least one neighboring user equipment of the user equipment are not limited to the above embodiments of the present disclosure. Those skilled in the art may include any other suitable contents in the interference information so as to help the base station perform scheduling for full duplex operation. Also, those skilled in the art may transmit the interference information to the base station by any other suitable manners than RRC signaling, physical layer and MAC layer as introduced herein.

According to an embodiment of the present disclosure, although not shown in FIG. 4, the wireless communication method 40 may further include a step of measuring the interference to form the interference information, wherein any type of signals from the user equipment is usable to measure the interference from the user equipment itself.

As described above, a base station can neither simply obtain intra-UE-interference and/or inter-UE-interference from CQI/RSRQ/RSSI report nor directly measure intra-UE-interference and/or inter-UE-interference at the base station side. In addition, there are no uplink signals measured by UE based on current RAN1 standards. Thus, how to measure intra-UE-interference and/or inter-UE-interference is one of most important problems for full duplex operation.

Specifically, before reporting the interference information about the interference from at least one of the user equipment itself and at least one neighboring user equipment of the user equipment to the base station, the user equipment may measure intra-UE-interference and/or inter-UE-interference at the user equipment side. More specifically, in principle, when a known signal is transmitted in UL channels from the user equipment, only its self-interference will be received at the user equipment if there is no other interference. Thus, for intra-UE-interference, since any type of uplink signals from the user equipment are known to itself, they can be used to measure it potentially.

Figure 5:
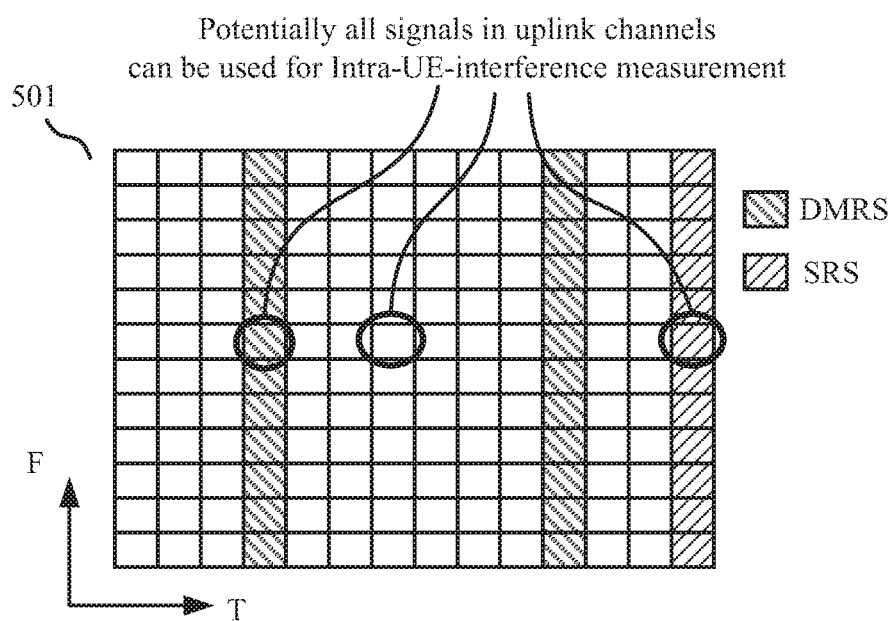
FIG. 5 schematically illustrates an example of frame structure of UL resource assignment in full duplex.

FIG. 5 schematically illustrates an example of frame structure of UL resource assignment in full duplex. As shown in FIG. 5, the horizontal axis indicated by T represents time domain while the vertical axis indicated by F represents frequency domain. The block 501 represents a PRB 501 which is assumed to be a full-duplex PRB in which both UL and DL channels are assigned. And, it is assumed that PRB 501 has a LTE frame structure and LTE resource assignments are taken as an example here. For purpose of simplification, the block 501 only shows UL resource assignment and each small square in block 501 represents a RE (resource element).

More specifically, as shown in block 501, small squares filled with left oblique lines represent REs assigned with UL DMRSs (Demodulation Reference Signals), small squares filled with right oblique lines represent REs assigned with UL SRSs (Sounding Reference Signals) and blank small squares represent REs assigned with UL data. As shown in FIG. 5, any UL signal (e.g. UL DMRS, UL SRS or UL data) assigned in any RE in PRB 501 or any combination thereof may be used for measure intra-UE-interference since all of UL signals are known to the user equipment itself.

The above example assumes that full duplex operation is performed between UE and base station; however, the present disclosure is not limited thereto. As described above, the full duplex operation may also be performed among UEs through sidelinks. In this case, since any type of sidelink signals transmitted from UE is known to itself, they can also be used to measure intra-UE-interference. In addition, there may be a more complicated case that DL/UL channels and sidelink channels are mixed. For example, UE receives DL from base station while transmitting sidelink to other UEs. DL and sidelink are operated in the same time/frequency resources. In this case, sidelink transmission causes self-interference (intra-UE-interference) to DL reception. Similarly, any type of sidelink signals transmitted from UE to other UEs can also be used to measure intra-UE-interference at this time. Another case is UE receives sidelink channel from other UEs but transmits UL channel to a base station in same time/frequency resources. In this case, UL transmission would generate some self-interference to sidelink reception and any type of UL signals may be used to measure self-interference at this time.

It is noted that signals used to measure intra-UE-interference is not limited to uplink and/or sidelink signals from UE. Any other type of signals such as backhaul link signals transmitted from UE and known to UE may be used to measure inter-UE-interference.

In the present embodiment, since any type of signals from the user equipment is usable to measure the intra-UE-interference, the accurate intra-UE-interference measurement can be achieved and the impact on the specification is little.

According to an embodiment of the present disclosure, in the wireless communication method 40 as shown in FIG. 4, the time/frequency resources in downlink channels for measuring the interference from at least one of the user equipment itself and at least one neighboring user equipment of the user equipment are configured by the base station.

Specifically, taking intra-UE-interference as an example, the base station may configure or indicate one or more PRBs or subframes in DL to be used for the intra-UE-interference measurement. Furthermore, during the one or more PRBs or subframes for measurement, the base station may control or coordinate other interference for example from other cells or DL/sidelink received signals so as to reduce or even avoid impact on intra-UE-interference measurement. Thus, the accuracy of intra-UE-interference measurement may be assured.

According to an embodiment of the present disclosure, although not shown in FIG. 4, the wireless communication method 40 may further include a step of averaging the measured interference over a physical resource unit to form the interference information.

Specifically, the interference information reported to the base station may be an averaged interference value over a physical resource unit. Here, the physical resource unit may be a PBR, one or more subframes, one or more subbands, etc depending on different cases.

For convenience of understanding, intra-UE-interference is also taken as an example. For example, intra-UE-interference may be averaged per PRB. Alternatively, if intra-UE-interference is to be reported by RRC signaling, it is more reasonable to average intra-UE-interference over several subframes. Alternatively, if intra-UE-interference is to be reported in physical layer, this information may be reported in terms of a wideband or a subband in a subframe or TTI. In one subframe or TTI, UE may report averaged intra-UE-interference on the wideband (which consists of multiple subbands) of one carrier of such subframe/TTI. It reflects averaged intra-UE-interference situation of whole subframe/TTI for a given carrier. In this case, it will take less signaling overheard. In addition, intra-UE-interference can be reported per subband, which will be more accurate on interference report and benefit for the base station's scheduling/coordination for full duplex operation. Its cost is that the signaling size for reporting is large. The base station may configure which reporting manner is to be used depending on different cases.

Although only intra-UE-interference measurement is discussed above, in addition to intra-UE-interference, inter-UE-interference may also be measured at the user equipment side. Specifically, the scenario as shown in FIG. 3 is taken as example here. UE 201 may measure the inter-UE-interference from its neighboring UE 204. The first measurement scheme needs the base station 202's assistance. Since UE 204 does not know UL signals transmitted from UE 204, the base station 202 should notify UE 201 of UL signals transmitted from UE 204 for the inter-UE-interference measurement. More specifically, as the inter-UE interference is from UE 204's UL transmission to UE 201's DL reception, the base station 202 may notify UE ID or sequence of UE 204 to UE 201, and UE 201 may measure the inter-UE-interference from UE 204 accordingly. In turn, the base station 202 may schedule/coordinate full duplex operation accordingly based on the measured inter-UE-interference.

As described above, although there is only one neighboring UE 204 shown in FIG. 3, there may be more neighboring UEs in the same cell. When there are two or more neighboring UEs and these neighboring UEs all cause inter-UE-interference to UE 204, UE 204 may measure inter-UE-interference from each of neighboring UEs with the bases station 202's assistance and report the same to the base station 202.

Alternatively, without the base station 202's assistance, UE 201 cannot know which UEs is around it. In this case, another measurement scheme for inter-UE-interference is that UE 201 detects other UEs' signal/interference blindly. In this case, UE 201 can measure the total inter-UE-interference from other UEs and report the same to the base station 202, but does not indicate which UE generates such inter-UE-interference. In this case, signaling design can be saved.

Similarly, since sidelink transmission may be performed between UEs as described above, inter-UE-interference may be caused from UL to sidelink or from sidelink to sidelink. For example, although not shown in FIG. 3, in a same physical unit, UE 201 receives sidelink signal from UE 204 and UE 204 transmits sidelink signal to another UE or transmit UL signal to the base station 202. In this case, UE 204 will generate inter-UE interference to UE 201. Even in this case, UE 201 could measure the interference from UE 204 by either of the above measurement schemes.

Similarly with cases of intra-UE-interference measurement, in cases of inter-UE-interference measurement, the time/frequency resources in UL/DL for inter-UE-interference measurement may also be indicated or configured by the base station. And, the base station may also control or coordinate other interference for example from other cells or DL received signals so as to reduce or even avoid impact on inter-UE-interference measurement. Thus, the accuracy of inter-UE-interference measurement may be assured. Also, the inter-UE-interference may also be averaged over any suitable physical resource unit depending on different situations.

It is noted that, the above intra-UE-interference and inter-UE-interference measurement examples are only for purpose of illustration but not limiting of the present disclosure. In addition, any existing mechanism for error handling may be used here and may be controlled by the base station, which will not be described here for avoid redundancy.

According to an embodiment of the present disclosure, in the wireless communication method 40 as shown in FIG. 4, downlink reference signals used for mobility measurement are not used for full duplex operation.

In cellular networks, when a mobile (a user equipment) moves from cell to cell and performs cell selection/reselection and handover, it has to measure the signal strength/quality of the neighbor cells. Assuming in a LTE network, a UE usually measures two parameters on RSs (reference signals) for mobility: RSRP (Reference Signal Received Power) and RSRQ (Reference Signal Received Quality) for example. And, these RSs measured for mobility can be named as mobility RSs herein. The mobility RSs may include CSI-RS, CRS (Cell-specific Reference Signal) or other RSs for example.

Figure 6:
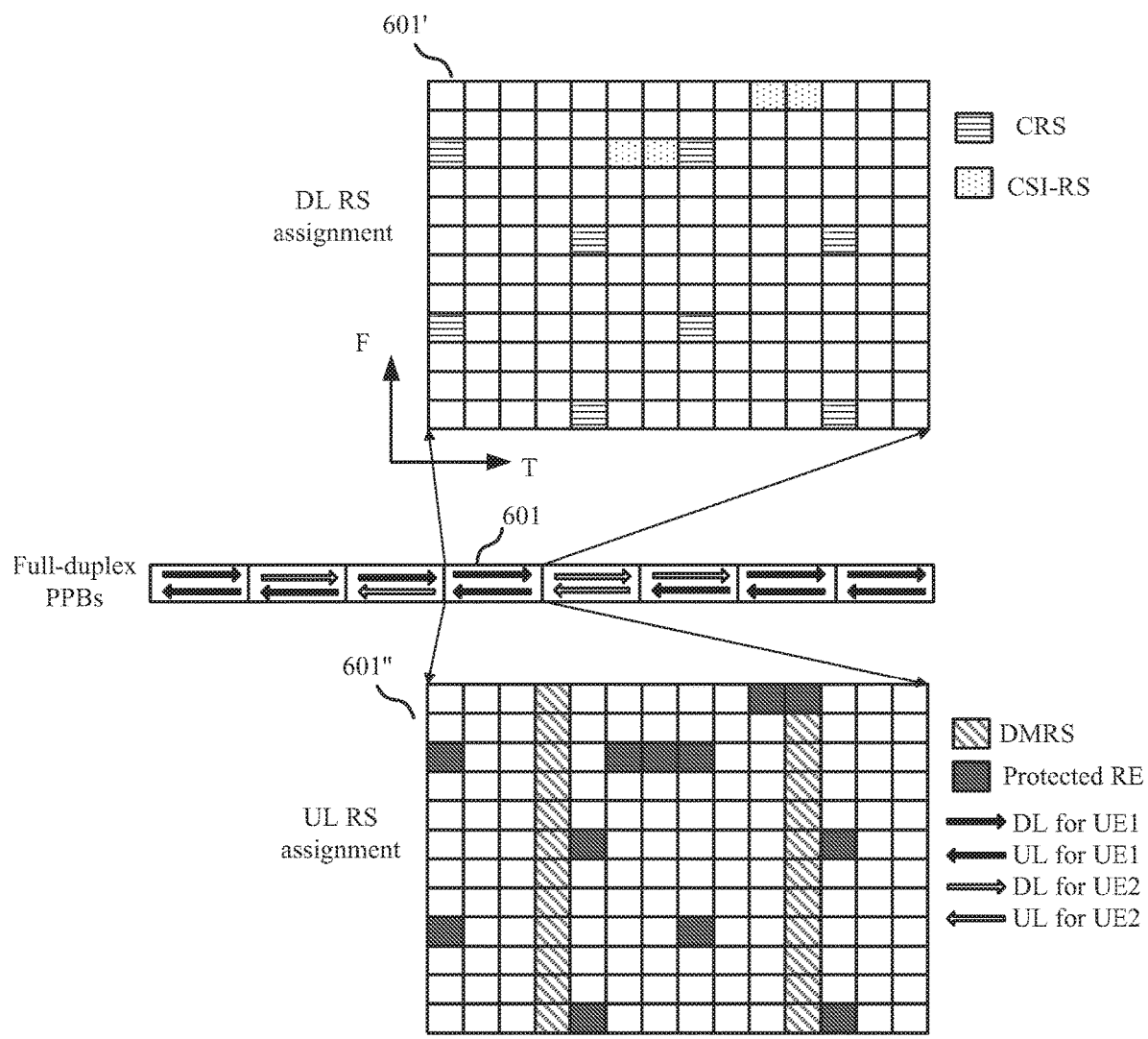
FIG. 6 schematically illustrates an example of frame structure of UL and DL RS assignment in full duplex.

FIG. 6 schematically illustrates an example of frame structure of UL and DL RS assignment in full duplex. As shown in FIG. 6, PRB 601 is assumed to be a full-duplex PRB in which both UL and DL channels are assigned. And, it is assumed that PRB 601 has a LTE frame structure and LTE RS assignments are taken as an example here. For example, the upper block 601' shows DL RS assignment while the lower block 601" shows UL RS assignment. It is noted that blocks 601' and 601" are both equivalent to the PRB 601 and each small square in blocks 601' and 601" represents a RE.

Also, as shown in PRB 601, the solid arrow pointing right means that DL signals assigned on this PRB is for UE1 while the solid arrow pointing left means that UL signals assigned on this PRB is for UE1 too. That is to say, this example corresponds to the case in which UL and DL transmissions are for a same UE.

More specifically, as shown in block 601', small squares filled with horizontal lines represent REs assigned with DL CRSs, small squares filled with points represent REs assigned with DL CSI-RSs and blank small squares represent REs assigned with DL data. Also, as shown in block 601", small squares filled with left oblique lines represent REs assigned with UL DMRSs, and blank small squares represent REs assigned with UL data.

As described above, since DL CRSs and DL CSI-RSs will be used for mobility measurement, REs assigned with these mobility RSs should be protected and UL signals should not be transmitted on these REs, as shown in dark small squares which represent REs to be protected.

By further considering the mobility DL RSs, the base station can make a trade-off on the cost between mobility performance and full duplex performance.

In the above, the wireless communication method 40 is described in detail with reference to FIGS. 2-6. With the wireless communication method 40, by reporting the interference information about interference from at least one of the user equipment itself and at least one neighboring user equipment of the user equipment to the base station, the base station can perform scheduling based on the interference information, thereby improving the accuracy of scheduling and the system performance.

Figure 7:
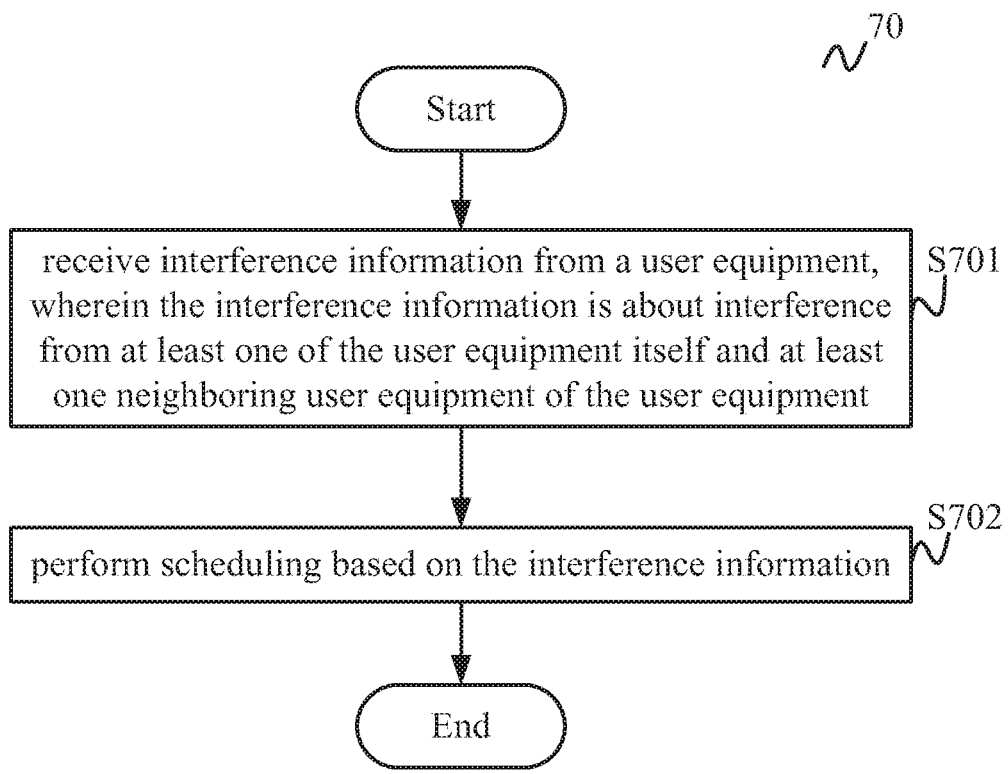
FIG. 7 illustrates a flowchart of a wireless communication method for a base station according to another embodiment of the present disclosure.

In another embodiment of the present disclosure, there is provided a wireless communication method 70 for a base station as shown in FIG. 7. FIG. 7 illustrates a flowchart of a wireless communication method 70 for a base station according to another embodiment of the present disclosure.

As shown in FIG. 7, the wireless communication method 70 starts at step S701 in which interference information from a user equipment is received, wherein the interference information is about interference from at least one of the user equipment itself and at least one neighboring user equipment of the user equipment. Then, at step S702, scheduling is performed based on the interference information. After step S702, the wireless communication method 70 ends. In the wireless communication method 70, full duplex operation is performed between the user equipment and at least the base station. That is to say, the wireless communication method 40 is applied to full duplex scenarios. For example, the wireless communication method 70 may be applied to the base station 202 as shown in FIGS. 2 and 3.

According to an embodiment of the present disclosure, in the wireless communication method 70 as shown in FIG. 7, the interference information comprises the interference cancellation capability of the user equipment, and the interference cancellation capability is transmitted by RRC signaling from the user equipment during the user equipment's capability transfer procedure.

According to an embodiment of the present disclosure, in the wireless communication method 70 as shown in FIG. 7, the interference information further comprises an absolute interference from at least one of the user equipment itself and at least one neighboring user equipment of the user equipment.

According to an embodiment of the present disclosure, in the wireless communication method 70 as shown in FIG. 7, the absolute interference is transmitted in MAC layer from the user equipment and accompanied by PHR based on PHR report timing.

According to an embodiment of the present disclosure, in the wireless communication method 70 as shown in FIG. 7, the absolute interference is transmitted by RRC signaling from the user equipment periodically or aperiodically.

According to an embodiment of the present disclosure, in the wireless communication method 70 as shown in FIG. 7, the interference information comprises a residual interference from at least one of the user equipment itself and at least one neighboring user equipment of the user equipment.

According to an embodiment of the present disclosure, in the wireless communication method 70 as shown in FIG. 7, the residual interference is transmitted in MAC layer from the user equipment and accompanied by PHR based on PHR report timing.

According to an embodiment of the present disclosure, in the wireless communication method 70 as shown in FIG. 7, the residual interference is transmitted in physical layer from the user equipment either periodically or aperiodically.

According to an embodiment of the present disclosure, although not shown in FIG. 7, the wireless communication method 70 may further include a step of transmitting a trigger to the user equipment by downlink control signaling, wherein the residual interference is transmitted from the user equipment based on the trigger.

According to an embodiment of the present disclosure, in the wireless communication method 70 as shown in FIG. 7, a new UCI type is defined for full duplex operation and is transmitted by PUCCH or PUSCH from the equipment, wherein the new UCI type indicates one of: a residual interference value; a request for stopping full duplex operation; a residual interference value and a request for stopping full duplex operation; and a request for stopping full duplex operation and an existing UCI type.

According to an embodiment of the present disclosure, in the wireless communication method 70 as shown in FIG. 7, the interference is measured at the user equipment to form the interference information, wherein any type of signals from the user equipment is usable to measure the interference from the user equipment itself.

According to an embodiment of the present disclosure, in the wireless communication method 70 as shown in FIG. 7, downlink reference signals used for mobility measurement are not used for full duplex operation.

According to an embodiment of the present disclosure, although not shown in FIG. 7, the wireless communication method 70 may further include a step of configuring the time/frequency resources in downlink channels for measuring the interference from at least one of the user equipment itself and at least one neighboring user equipment of the user equipment.

According to an embodiment of the present disclosure, in the wireless communication method 70 as shown in FIG. 7, the measured interference is averaged over a physical resource unit to form the interference information at the user equipment.

With the wireless communication method 70, by reporting the interference information about interference from at least one of the user equipment itself and at least one neighboring user equipment of the user equipment to the base station, the base station can perform scheduling based on the interference information, thereby improving the accuracy of scheduling and the system performance.

Figure 8:
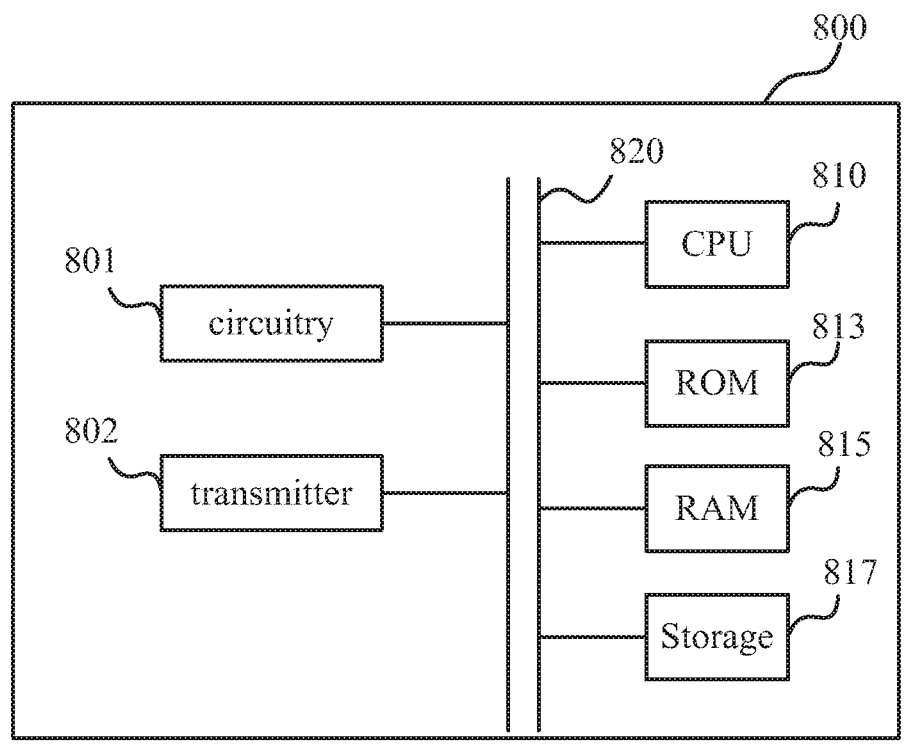
FIG. 8 illustrates a block diagram of a user equipment according to a further embodiment of the present disclosure.

In a further embodiment of the present disclosure, there is provided a user equipment 800 as shown in FIG. 8. FIG. 8 illustrates a block diagram of a user equipment 800 according to a further embodiment of the present disclosure.

As shown in FIG. 8, the user equipment 800 includes: a circuitry 801 operative to form interference information about interference from at least one of the user equipment itself and at least one neighboring user equipment of the user equipment and a transmitter 802 operative to transmit the interference information to a base station. Full duplex operation is performed between the user equipment 800 and at least the base station.

The user equipment 800 according to the present embodiment may further include a CPU (Central Processing Unit) 810 for executing related programs to process various data and control operations of respective units in the user equipment 800, a ROM (Read Only Memory) 813 for storing various programs required for performing various process and control by the CPU 810, a RAM (Random Access Memory) 815 for storing intermediate data temporarily produced in the procedure of process and control by the CPU 810, and/or a storage unit 817 for storing various programs, data and so on. The above circuitry 801, transmitter 802, CPU 810, ROM 813, RAM 815 and/or storage unit 817 etc. may be interconnected via data and/or command bus 820 and transfer signals between one another.

Respective units as described above do not limit the scope of the present disclosure. According to one embodiment of the disclosure, the functions of the above circuitry 801 and transmitter 802 may be implemented by hardware, and the above CPU 810, ROM 813, RAM 815 and/or storage unit 817 may not be necessary. Alternatively, part or all of functions of the above circuitry 801 or transmitter 802 may also be implemented by functional software in combination with the above CPU 810, ROM 813, RAM 815 and/or storage unit 817 etc.

Specifically, the user equipment 800 may be UE 201 shown in FIGS. 2 and 3 and may perform the wireless communication method 40 as described above in conjunction with FIG. 4.

With the user equipment 800, by reporting the interference information about interference from at least one of the user equipment itself and at least one neighboring user equipment of the user equipment to the base station, the base station can perform scheduling based on the interference information, thereby improving the accuracy of scheduling and the system performance.

Note that, the other technical features in the above wireless communication method 40 can also be incorporated in the user equipment 800 and will not be described here for avoid redundancy.

Figure 9:
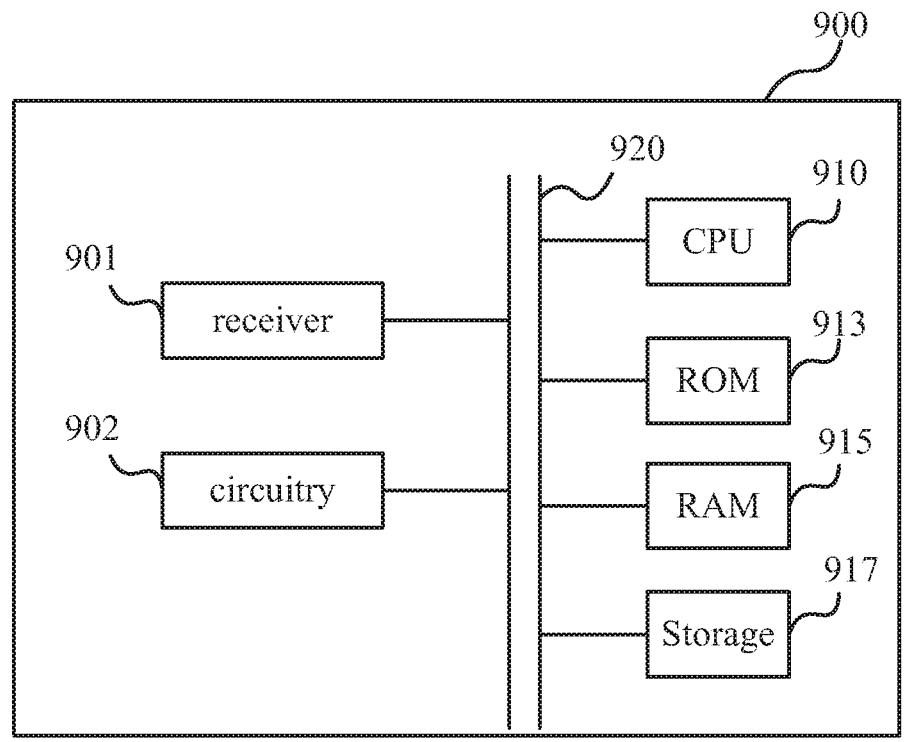
FIG. 9 illustrates a block diagram of a base station according to another embodiment of the present disclosure.

In another embodiment of the present disclosure, there is provided a base station 900 as shown in FIG. 9. FIG. 9 illustrates a block diagram of a base station 900 according to another embodiment of the present disclosure.

As shown in FIG. 9, the base station 900 includes: a receiver 901 operative to receive interference information from a user equipment, wherein the interference information is about interference from at least one of the user equipment itself and at least one neighboring user equipment of the user equipment; and a circuitry 902 operative to perform scheduling based on the interference information. Full duplex operation is performed between the user equipment and at least the base station 900.

The base station 900 according to the present embodiment may further include a CPU (Central Processing Unit) 910 for executing related programs to process various data and control operations of respective units in the base station 900, a ROM (Read Only Memory) 913 for storing various programs required for performing various process and control by the CPU 910, a RAM (Random Access Memory) 915 for storing intermediate data temporarily produced in the procedure of process and control by the CPU 910, and/or a storage unit 917 for storing various programs, data and so on. The above receiver 901, circuitry 902, CPU 910, ROM 913, RAM 915 and/or storage unit 917 etc. may be interconnected via data and/or command bus 920 and transfer signals between one another.

Respective units as described above do not limit the scope of the present disclosure. According to one embodiment of the disclosure, the functions of the above receiver 901 and circuitry 902 may be implemented by hardware, and the above CPU 910, ROM 913, RAM 915 and/or storage unit 917 may not be necessary. Alternatively, part or all of functions of the above receiver 901 and/or circuitry 902 may also be implemented by functional software in combination with the above CPU 910, ROM 913, RAM 915 and/or storage unit 917 etc.

Specifically, the base station 900 may be the base station 202 shown in FIGS. 2 and 3 and may perform the wireless communication method 70 as described above in conjunction with FIG. 7.

With the base station 900, by reporting the interference information about interference from at least one of the user equipment itself and at least one neighboring user equipment of the user equipment to the base station, the base station can perform scheduling based on the interference information, thereby improving the accuracy of scheduling and the system performance.

Note that, the other technical features in the above wireless communication method 70 can also be incorporated in the base station 900 and will not be described here for avoid redundancy.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A user equipment, comprising:
  circuitry operative to form interference information about interference from at least one of the user equipment itself and at least one neighboring user equipment of the user equipment; and
  a transmitter operative to transmit the interference information to a base station, wherein
  full duplex operation is performed between the user equipment and at least the base station.

(2). The user equipment according to (1), wherein the interference information comprises the interference cancellation capability of the user equipment, and the interference cancellation capability is transmitted by RRC (Radio Source Control) signaling during the user equipment's capability transfer procedure.

(3). The user equipment according to (2), wherein the interference information further comprises an absolute interference from at least one of the user equipment itself and at least one neighboring user equipment of the user equipment.

(4). The user equipment according to (3), wherein the absolute interference is transmitted in MAC (Media Access Control) layer and accompanied by PHR (Power Headroom Report) based on PHR report timing.

(5). The user equipment according to (3), wherein the absolute interference is transmitted by RRC signaling periodically or aperiodically.

(6). The user equipment according to (1), wherein the interference information comprises a residual interference from at least one of the user equipment itself and at least one neighboring user equipment of the user equipment.

(7). The user equipment according to (6), wherein the residual interference is transmitted in MAC layer and accompanied by PHR based on PHR report timing.

(8). The user equipment according to (6), wherein the residual interference is transmitted in physical layer either periodically, or aperiodically based on a trigger transmitted by downlink control signaling from the base station.

(9). The user equipment according to (8), wherein a new UCI (Uplink Control Information) type is defined for full duplex operation and is transmitted by PUCCH (Physical Uplink Control Channel) or PUSCH (Physical Uplink Shared Channel), wherein the new UCI type indicates one of: a residual interference value; a request for stopping full duplex operation; a residual interference value and a request for stopping full duplex operation; and a request for stopping full duplex operation and an existing UCI type.

(10). The user equipment according to (1), wherein the circuitry further measures the interference to form the interference information, wherein any type of signals from the user equipment is usable to measure the interference from the user equipment itself.

(11). The user equipment according to (10), wherein downlink reference signals used for mobility measurement are not used for full duplex operation.

(12). The user equipment according to (10), wherein the time/frequency resources in downlink channels for measuring the interference from at least one of the user equipment itself and at least one neighboring user equipment of the user equipment are configured by the base station.

(13). The user equipment according to (10), wherein the circuitry further averages the measured interference over a physical resource unit to form the interference information.

(14). A base station, comprising:
  a receiver operative to receive interference information from a user equipment, wherein the interference information is about interference from at least one of the user equipment itself and at least one neighboring user equipment of the user equipment; and
  circuitry operative to perform scheduling based on the interference information, wherein
  full duplex operation is performed between the user equipment and at least the base station.

(15). The base station according to (14), wherein the interference information comprises the interference cancellation capability of the user equipment, and the interference cancellation capability is transmitted by RRC (Radio Source Control) signaling from the user equipment during the user equipment's capability transfer procedure.

(16). The base station according to (15), wherein the interference information further comprises an absolute interference from at least one of the user equipment itself and at least one neighboring user equipment of the user equipment.

(17). The base station according to (16), wherein the absolute interference is transmitted in MAC (Media Access Control) layer from the user equipment and accompanied by PHR (Power Headroom Report) based on PHR report timing.

(18). The user equipment according to (16), wherein the absolute interference is transmitted by RRC signaling from the user equipment periodically or aperiodically.

(19). The base station according to (14), wherein the interference information comprises a residual interference from at least one of the user equipment itself and at least one neighboring user equipment of the user equipment.

(20). The base station according to (19), wherein the residual interference is transmitted in MAC layer from the user equipment and accompanied by PHR based on PHR report timing.

(21). The base station according to (19), wherein the residual interference is transmitted in physical layer from the user equipment either periodically or aperiodically.

(22). The base station according to (21), further comprising:
  a transmitter operative to transmit a trigger to the user equipment by downlink control signaling, wherein the residual interference is transmitted from the user equipment based on the trigger.

(23). The base station according to (21), wherein a new UCI (Uplink Control Information) type is defined for full duplex operation and is transmitted by PUCCH (Physical Uplink Control Channel) or PUSCH (Physical Uplink Shared Channel) from the equipment, wherein the new UCI type indicates one of: a residual interference value; a request for stopping full duplex operation; a residual interference value and a request for stopping full duplex operation; and a request for stopping full duplex operation and an existing UCI type.

(24). The base station according to (1), wherein the interference is measured at the user equipment to form the interference information, wherein any type of signals from the user equipment is usable to measure the interference from the user equipment itself.

(25). The base station according to (24), wherein downlink reference signals used for mobility measurement are not used for full duplex operation.

(26). The base station according to (24), wherein the circuitry further configures the time/frequency resources in downlink channels for measuring the interference from at least one of the user equipment itself and at least one neighboring user equipment of the user equipment.

(27). The base station according to (24), wherein the measured interference is averaged over a physical resource unit to form the interference information at the user equipment.

(28). A wireless communication method for a user equipment, comprising:
forming interference information about interference from at least one of the user equipment itself and at least one neighboring user equipment of the user equipment; and
transmitting the interference information to a base station, wherein
full duplex operation is performed between the user equipment and at least the base station.

(29). The wireless communication method according to (28), wherein the interference information comprises the interference cancellation capability of the user equipment, and the interference cancellation capability is transmitted by RRC (Radio Source Control) signaling during the user equipment's capability transfer procedure.

(30). The wireless communication method according to (29), wherein the interference information further comprises an absolute interference from at least one of the user equipment itself and at least one neighboring user equipment of the user equipment.

(31). The wireless communication method according to (30), wherein the absolute interference is transmitted in MAC (Media Access Control) layer and accompanied by PHR (Power Headroom Report) based on PHR report timing.

(32). The wireless communication method according to (30), wherein the absolute interference is transmitted by RRC signaling periodically or aperiodically.

(33). The wireless communication method according to (28), wherein the interference information comprises a residual interference from at least one of the user equipment itself and at least one neighboring user equipment of the user equipment.

(34). The wireless communication method according to (33), wherein the residual interference is transmitted in MAC layer and accompanied by PHR based on PHR report timing.

(35). The wireless communication method according to (33), wherein the residual interference is transmitted in physical layer either periodically, or aperiodically based on a trigger transmitted by downlink control signaling from the base station.

(36). The wireless communication method according to (35), wherein a new UCI (Uplink Control Information) type is defined for full duplex operation and is transmitted by PUCCH (Physical Uplink Control Channel) or PUSCH (Physical Uplink Shared Channel), wherein the new UCI type indicates one of: a residual interference value; a request for stopping full duplex operation; a residual interference value and a request for stopping full duplex operation; and a request for stopping full duplex operation and an existing UCI type.

(37). The wireless communication method according to (28), further comprising: measuring the interference to form the interference information, wherein any type of signals from the user equipment is usable to measure the interference from the user equipment itself.

(38). The wireless communication method according to (37), wherein downlink reference signals used for mobility measurement are not used for full duplex operation.

(39). The wireless communication method according to (37), wherein the time/frequency resources in downlink channels for measuring the interference from at least one of the user equipment itself and at least one neighboring user equipment of the user equipment are configured by the base station.

(40). The wireless communication method according to (37), further comprising: averaging the measured interference over a physical resource unit to form the interference information.

(41). A wireless communication method for a base station, comprising:
receiving interference information from a user equipment, wherein the interference information is about interference from at least one of the user equipment itself and at least one neighboring user equipment of the user equipment; and
performing scheduling based on the interference information, wherein
full duplex operation is performed between the user equipment and at least the base station.

(42). The wireless communication method according to (41), wherein the interference information comprises the interference cancellation capability of the user equipment, and the interference cancellation capability is transmitted by RRC (Radio Source Control) signaling from the user equipment during the user equipment's capability transfer procedure.

(43). The wireless communication method according to (42), wherein the interference information further comprises an absolute interference from at least one of the user equipment itself and at least one neighboring user equipment of the user equipment.

(44). The wireless communication method according to (43), wherein the absolute interference is transmitted in MAC (Media Access Control) layer from the user equipment and accompanied by PHR (Power Headroom Report) based on PHR report timing.

(45). The wireless communication method according to (43), wherein the absolute interference is transmitted by RRC signaling from the user equipment periodically or aperiodically.

(46). The wireless communication method according to (41), wherein the interference information comprises a residual interference from at least one of the user equipment itself and at least one neighboring user equipment of the user equipment.

(47). The wireless communication method according to (46), wherein the residual interference is transmitted in MAC layer from the user equipment and accompanied by PHR based on PHR report timing.

(48). The wireless communication method according to (46), wherein the residual interference is transmitted in physical layer from the user equipment either periodically or aperiodically.

(49). The wireless communication method according to (48), further comprising: transmitting a trigger to the user equipment by downlink control signaling, wherein the residual interference is transmitted from the user equipment based on the trigger.

(50). The wireless communication method according to (48), wherein a new UCI (Uplink Control Information) type is defined for full duplex operation and is transmitted by PUCCH (Physical Uplink Control Channel) or PUSCH (Physical Uplink Shared Channel) from the equipment, wherein the new UCI type indicates one of: a residual interference value; a request for stopping full duplex operation; a residual interference value and a request for stopping full duplex operation; and a request for stopping full duplex operation and an existing UCI type.

(51). The wireless communication method according to (41), wherein the interference is measured at the user equipment to form the interference information, wherein any type of signals from the user equipment is usable to measure the interference from the user equipment itself.

(52). The wireless communication method according to (51), wherein downlink reference signals used for mobility measurement are not used for full duplex operation.

(53). The wireless communication method according to (51), further comprising: configuring the time/frequency resources in downlink channels for measuring the interference from at least one of the user equipment itself and at least one neighboring user equipment of the user equipment.

(54). The wireless communication method according to (51), wherein the measured interference is averaged over a physical resource unit to form the interference information at the user equipment.

In addition, embodiments of the present disclosure can also provide an integrated circuit which comprises module(s) for performing the step(s) in the above respective communication methods. Further, embodiments of the present can also provide a computer readable storage medium having stored thereon a computer program containing a program code which, when executed on a computing device, performs the step(s) of the above respective communication methods.

The invention claimed is:

1. A user equipment, comprising:
circuitry which, in operation,
measures interference from at least one user equipment selected from the user equipment and a neighboring user equipment of the user equipment; and
determines residual interference; and
a transmitter which, in operation, transmits a full duplex UCI (Uplink Control Information) using a PUCCH (Physical Uplink Control Channel) or a PUSCH (Physical Uplink Shared Channel) to a base station, wherein the full duplex UCI indicates a residual interference value of the residual interference and a request for stopping full duplex operation, and wherein the full duplex UCI is jointly coded with another UCI, wherein:
the full duplex operation is performed between the user equipment and at least the base station, and
downlink reference signals used for mobility measurement are not used for the full duplex operation.

2. The user equipment according to claim 1, wherein the transmitter, in operation, transmits interference information includes interference cancellation capability of the user equipment, and the interference cancellation capability is transmitted by RRC (Radio Resource Control) signaling during a capability transfer procedure of the user equipment.

3. The user equipment according to claim 2, wherein the interference information includes an absolute interference from the at least one user equipment selected from the user equipment and the neighboring user equipment.

4. The user equipment according to claim 3, wherein the absolute interference is transmitted in MAC (Medium Access Control) layer and accompanied by PHR (Power Headroom Report) based on PHR report timing.

5. The user equipment according to claim 3, wherein the absolute interference is transmitted by RRC signaling periodically or aperiodically.

6. The user equipment according to claim 1, wherein time/frequency resources in downlink channels for measuring the interference are configured by the base station.

7. The user equipment according to claim 1, wherein the full duplex UCI indicates the residual interference value, the request for stopping the full duplex operation and the another UCI.

8. A base station, comprising:
a receiver which, in operation, receives, from a user equipment, a full duplex UCI (Uplink Control Information) using a PUCCH (Physical Uplink Control Channel) or a PUSCH (Physical Uplink Shared Channel), wherein the full duplex UCI indicates a residual interference value of residual interference measured by the user equipment from at least one user equipment selected from the user equipment and a neighboring user equipment of the user equipment, a request for stopping full duplex operation and another UCI, and wherein the full duplex UCI is jointly coded with the another UCI; and
circuitry which, in operation, performs scheduling based on the full duplex UCI, wherein
the full duplex operation is performed between the user equipment and at least the base station, and
downlink reference signals used for mobility measurement are not used for the full duplex operation.

9. The base station according to claim 8, wherein the receiver, in operation, receives interference information includes interference cancellation capability of the user equipment, and the interference cancellation capability is transmitted by RRC (Radio Resource Control) signaling from the user equipment during a capability transfer procedure of the user equipment.

10. The base station according to claim 9, wherein the interference information further includes an absolute interference from the at least one user equipment selected from the user equipment and the neighboring user equipment.

11. The base station according to claim 10, wherein the absolute interference is transmitted in MAC (Medium Access Control) layer from the user equipment and accompanied by PHR (Power Headroom Report) based on PHR report timing.

12. A wireless communication method for a user equipment, comprising:

measuring interference from at least one user equipment selected from the user equipment and a neighboring user equipment of the user equipment;
determining a residual interference; and
transmitting a full duplex UCI (Uplink Control Information) using a PUCCH (Physical Uplink Control Channel) or a PUSCH (Physical Uplink Shared Channel) a base station, wherein the full duplex UCI indicates a residual interference value of the residual interference, a request for stopping full duplex operation and another UCI, wherein the full duplex UCI is jointly coded with the another UCI, and wherein
the full duplex operation is performed between the user equipment and at least the base station, and
downlink reference signals used for mobility measurement are not used for the full duplex operation.

\* \* \* \* \*